Recording and Reading Waveforms.

Inventors
D.S. RIDLER -
A.D. ODELL
By [signature]
Attorney

Inventors
D. S. RIDLER
A. D. ODELL
By [signature]
Attorney

Feb. 6, 1962 D. S. RIDLER ET AL 3,020,526

INTELLIGENCE STORAGE EQUIPMENT

Filed Dec. 19, 1955

6 Sheets-Sheet 3

Inventor
D. S. RIDLER -
A. D. ODELL
By [signature]
Attorney

Inventor
D. S. RIDLER-
A. D. ODELL
By [signature]
Attorney

Inventor
D. S. RIDLER -
A. D. ODELL
By [signature]
Attorney

Inventors
D. S. RIDLER -
A. D. ODELL
By [signature]
Attorney

United States Patent Office
3,020,526
Patented Feb. 6, 1962

3,020,526
INTELLIGENCE STORAGE EQUIPMENT

Desmond Sydney Ridler and Alexander Douglas Odell, London, England, assignors to International Standard Electric Corporation, New York, N.Y.

Filed Dec. 19, 1955, Ser. No. 554,037
Claims priority, application Great Britain Dec. 31, 1954
4 Claims. (Cl. 340—174.1)

The present invention relates to intelligence storage equipment in which intelligence is stored on a magnetic recording medium.

According to the present invention there is provided a magnetic storage system for intelligence each element of which may have any one of a plurality of different values, in which each element of said intelligence is recorded as a pattern of magnetisation on a magnetic recording medium, and in which the pattern of magnetisation representing each of said plurality of different values consists of a different number (including one) of reversals of the orientation of said magnetisation.

According to the present invention there is also provided a magnetic storage system for intelligence each element of which may have either one of two different values, in which each element of said intelligence is recorded as a pattern of magnetisation within a discrete length of an endless magnetic track on the periphery of a rotatable drum, and in which the pattern of magnetisation representing the first of said values consists of a single reversal of the orientation of said magnetisation and the pattern of magnetisation representing the second of said values consists of two reversals of the orientation of said magnetisation.

According to the present invention there is further provided a magnetic storage system for intelligence each element of which may have any one of three different values, in which each element of said intelligence is recorded as a pattern of magnetisation within a discrete length of an endless magnetic track on the periphery of a rotatable drum, and in which the patterns of magnetisation representing the first of said values consists of a single reversal of the orientation of said magnetisation, the pattern of magnetisation representing the second of said values consists of two reversals of the orientation of said magnetisation and the pattern of magnetisation representing the third of said values consists of three reversals of the orientation of said magnetisation.

The invention will now be described with reference to the accompanying drawings, in which.

In the circuits, signal gates are represented by circles each containing a numeral indicating the number of gate inputs which must be activated to make the gate produce an output signal. Hence if a gate has a plurality of inputs, it is at once identified as an "or" gate if the gate circle contains numeral 1 and is immediately identified as an "and" gate if the circumscribed numeral is 2 or 3.

Figure 1:
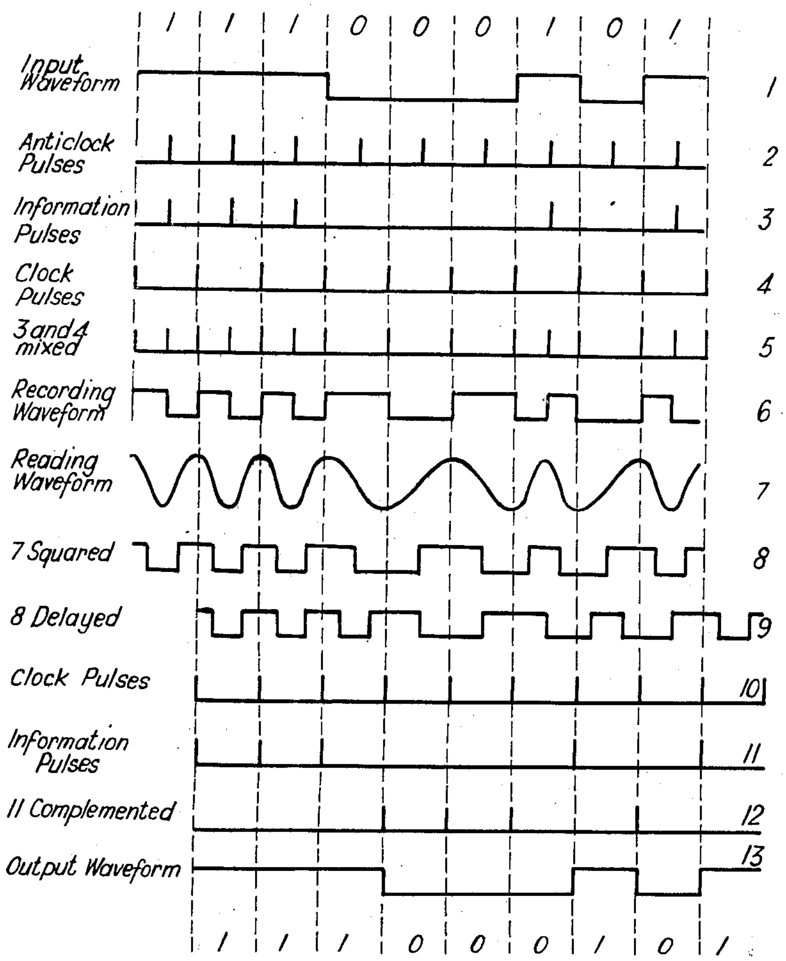
FIG. 1 shows recording and reading waveforms which occur in a first embodiment of the invention in which intelligence in a two-condition code (e.g. binary notation or printing telegraph code) is recorded on a magnetic recording medium such as an endless magnetic track on the periphery of a rotatable drum.

In the method of recording which is described herein with reference to the waveforms shown in FIG. 1, it is assumed that the binary number 111000101 is to be recorded, and the waveform 1 in FIG. 1, designated, "Input Waveform," shows a voltage condition representing this number such as might occur at the output of a bistable trigger device. Where this waveform includes a number of consecutive digits having the same value, the voltage is continuous. However, the instantaneous value of the voltage at the instant of time representing the mid-point of a digit gives the significance, 0 or 1, of that digit. The beginning, mid-point, and end of each digit is determined by some timing arrangement which is synchronised with the movement of the recording medium. In the present arrangement which is used for recording on a track on a magnetic drum, it is convenient to obtain this timing from clock-pulses pre-recorded on the drum. By feeding these clock pulses through a delay circuit which delays them by half a digit time, a second set of pulses is obtained which are in "anti-phase," i.e. the pulses are each shifted by half a digit time, with respect to the clock pulses. These pulses are therefore referred to herein as "anti-clock pulses."

Figure 2:
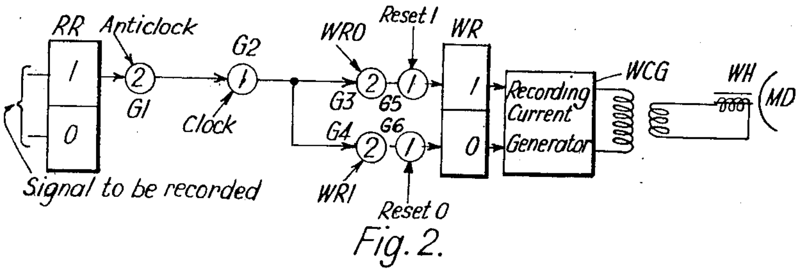
FIG. 2 shows the recording circuit used in the embodiment of the invention whose waveforms are shown in FIG. 1.

The intelligence input is examined at the mid-point of each element by an "and" gate G1, FIG. 2. This has two controls, one being the anticlock pulses, and the other being output 1 of a bistable circuit RR. The latter has its output 1 energised if the digit then to be recorded is 1 and output 0 energised if the digit is 0. Where intelligence represented in printing telegraph code is being dealt with, the values of each digit or element are "mark," corresponding to 1, and "space," corresponding to 0. Hence G1 delivers an output pulse, which is a short pulse equal in length to an anticlock pulse, at the mid-point of each 1 to be recorded, and no output for 0. Waveform 3 in FIG. 1 shows the output from G1 which corresponds to the number 111000101.

The information pulses and the clock pulses are now applied to an "or" or mixer gate G2, which gives as its output waveform 5, since G2 gives an output whenever either of its controls is energised. Waveform 4 shows the clock pulses. The result of the mixing is therefore a train of clock pulses each of which marks the start of an element, with a pulse half a digit time after the clock pulse for each digit which is one.

Figure 3:
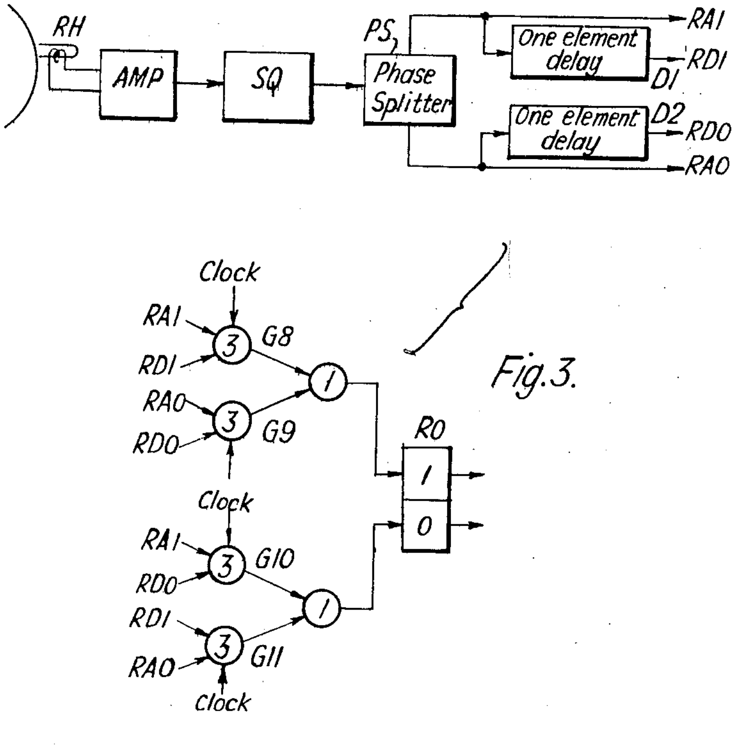
FIG. 3 shows the reading circuit used in the circuit whose waveforms are shown in FIG. 1.

Waveform 5 is used to control a bistable device WR, which is cross-gated so as to act as a binary pair. Thus "and" gate G3 controlling WR1 via "or" gate G5 has two controls, one being WR0 and the other being the output from G2. Similarly "and" gate G4 controls WR0 via "or" gate G6, the two controls being WR1 and the output from G2. The normal condition is with WR0 operated, this being ensured by an iniital energisation of the alternative input to G6, which is marked Reset 0. The alternative input Reset 1 for G5 is provided in case a reset to 1 is desired, as might be true in some cases, for instance, where incoming intelligence has to have its elements reversed during recording. As far as the circuit of FIG. 3 is concerned, Reset 1 and Reset 0 may be considered as an available control potential momentarily switched manually either to G5 or G6 before recording operation starts.

Preliminary setting of trigger WR to either desired starting status also may be effected in any other well known manner.

Waveform 6, FIG. 1, shows the output from WR, the positive portion representing WR1 operated and the negative portion representing WR0 operated. It will be seen that in this waveform, each digit which is 1 is represented by a double reversal of the output during a digit time while each digit which is 0 is represented by a single reversal of the output during a digit time.

The output from WR is applied via a recording current generator WCG via a transformer to a recording head, shown symbolically at WH, which is in close proximity to the surface of a magnetic drum MD. It is clear thus far that the intelligence elements are each recorded within equal, predetermined magnetic track intervals dependent on the time interval between clock pulses. This track interval may be referred to as the digit or element interval. In such interval, element 0 is represented by a single reversal of magnetization in either positive or negative going direction while the element 1 is represented in the element interval by two consecutive reversals of magnetic direction, the first of which may be either positive or negative going and the second of which is always in opposite direction to the first. It follows that the element 0 is represented magnetically in an element interval of the record medium by a single wide pulse simulating form of either positive or negative polarity and that the element 1 is represented in an element interval by two successive pulse simulating forms of relatively opposite polarity, each of the latter forms half the width of the 0 pulse form. It can be put then that the different intelligence elements are magnetically represented in equal element intervals by pulse simulating forms differing in number and width.

FIG. 3 shows a circuit for reading and interpreting the digit representing reversals of magnetization simulating waveform 6.

The output waveform from the read head RH (FIG. 3) due to a recorded number or word is proportional to the rate of change of the flux, and therefore has maxima corresponding to the points of transition of waveform 6. When the elements are recorded close together, as is essential to use the equipment economically, the voltage appearing at the read head will have the form shown at waveform 7 in FIG. 1. Each negative-to-positive transition in waveform 6 appears in the read head waveform 7 as a positive maximum, and each positive-to-negative transition in waveform 6 appears in the read-head waveform 7 as a negative maximum. After the waveform 7 has been amplified by the amplifier AMP (FIG. 3) and squared by the squarer SQ, it has the waveform 8. Where it is desired immediately to re-record what is read, or to record it on another drum track, waveform 6 can be derived from waveform 8 by integration and squaring. This integration and squaring of waveform 8 could be performed for another reason, i.e. to form the basis of a different method of re-constituting the input waveform.

From a perusal of waveform 6, FIG. 1, it will be seen that at the beginning and at the end of a digit there is always a transition, and further that the transitions at the beginning and end of a digit are different when that digit is a 0, while the transitions at the beginning and end of a digit are in the same sense when that digit is a 1. The generation of waveform 8 from waveform 6 via the recording and reading processes involves the differentiation of the waveform 6, and so the required intelligence can be reconstituted by delaying waveform 8 by one digit time to give waveform 9. These two waveforms are then compared at the appropriate times as indicated by the clock pulses 10, and if both 8 and 9 are identical, an intelligence pulse is generated. If they differ, no pulse is produced. These pulses are shown at 11, FIG. 1, and are applied, with their complement 12, to a bistable trigger device RO, FIG. 3, which produces waveform 13 at its output.

In the circuit of FIG. 3, the output from the squarer is applied to a phase splitter PS, whose two outputs form waveforms RA1, waveform 8, and RA0, waveform 8 inverted. Both of these waveforms pass through one element time delays D1 and D2 respectively to produce output RD1, waveform 9, and RD0, waveform 9 inverted.

The gates G8, G9, G10 and G11 examine the RA and RD outputs under control of clock pulses, and from an examination of their controls it will be seen that the bistable circuit RO is set to RO1 when the RA and RD waveforms are identical at the examining time, and is set to RO0 when these waveforms are not identical at the examining time.

Figure 4:
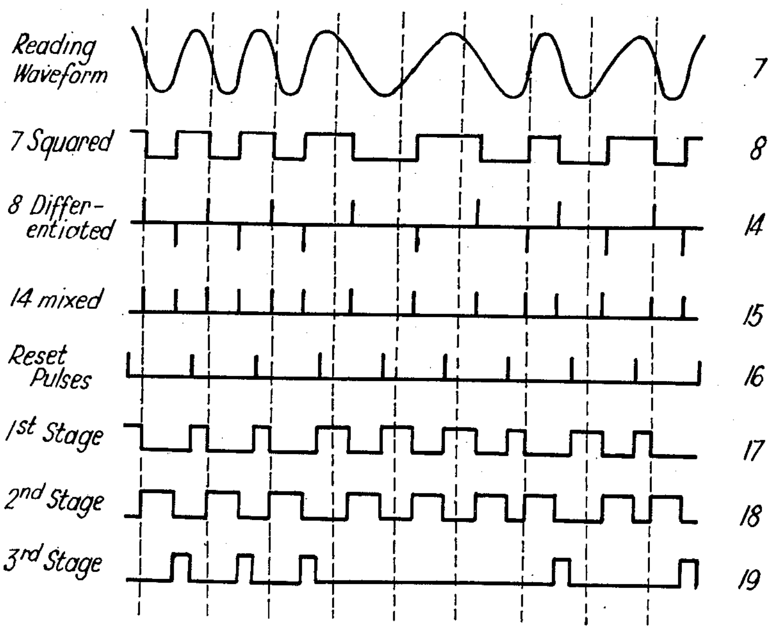
FIG. 4 shows the reading waveforms which occur in a modified reading circuit.
Figure 5:
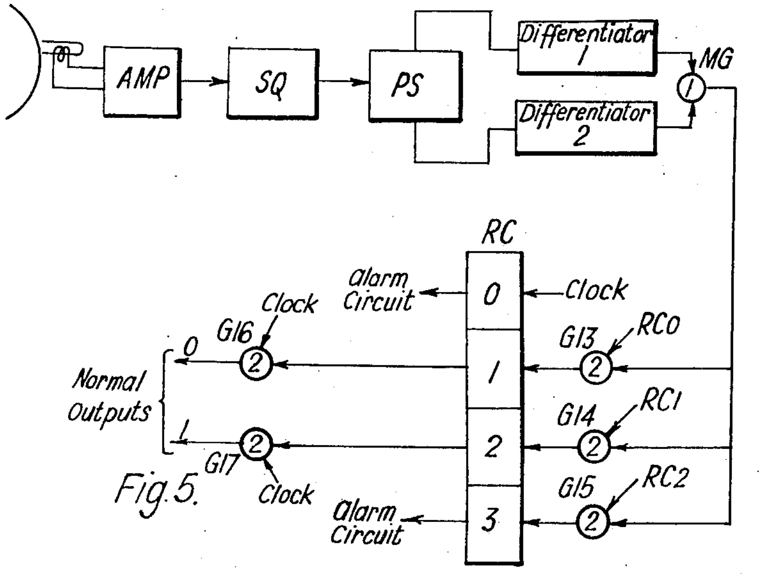
FIG. 5 shows the modified reading circuit whose waveforms are shown in FIG. 4.

The waveforms of FIG. 4 apply to the reading system shown in FIG. 5, in which the basic principle of operation is to count the transitions of waveform 8 during each element time, there being an 0 (or space) element for one transition and a 1 (or mark) element for two transitions. The outputs from the phase splitter S provide two differentiation circuits, identified as "Differentiator 1" and "Differentiator 2," with waveform 8 and inverted waveform 8, respectively, and the differentiated waveforms are applied to a mixing gate MG to give waveform 15, the output of differentiator 1 being shown at 14. The output of the other differentiator is an inverted version of 14, and MG only passes the positive-going pulses. Hence waveform 15 is applied to one control on each of three gates G13, G14, and G15. These gates control the units 1, 2, 3, respectively, of a multi-stable register RC. This consists of four units, only one of which can be operated at a time. If another unit becomes operated, the previously operated unit is rendered non-operated. Initially RC is set to RC0, this being ensured by the application thereto of reset pulses so that RC is reset to RC0 slightly before the start of each element. These pulses are shown as waveform 16, and can be the normal clock pulses.

When waveform 15 arrives, it finds G13 with one control energised from RC0, so G13 opens to operate RC1 in response to the first pulse for the intelligence element being dealt with. If the element is 0, the circuit RC remains at RC1 to condition a gate G16 for response to a clock pulse, while if the element is a 1, the second pulse, via G14, operates RC2 to condition a gate G17 for response to the clock pulse. Hence when the next clock pulse occurs, RC1 or RC2 will be in operated status depending on whether the element is 0 or 1. This clock pulse opens gates G16 and G17, and G16 passes a pulse to the output if the element is 0 and G17 passes a pulse if the element is 1. The clock pulse also resets the device RC to RC0.

If the waveform applied to G13—G15 contains no pulses for an element, RC0 is still operated when the clock pulse occurs, while if more than two pulses occur, RC3 is then operated. Either of these is a fault condition, so if RC0 or RC3 is operated when the resetting clock pulse occurs an alarm is given.

Figures 6, 7:
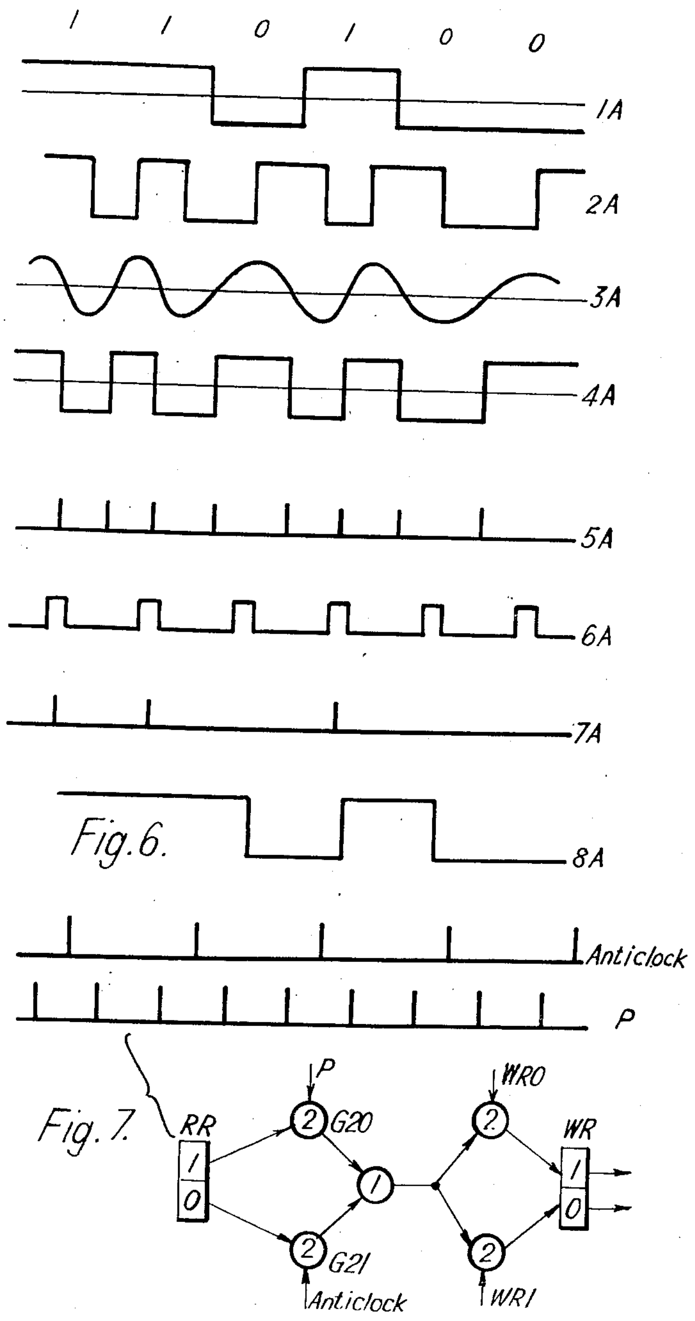
FIG. 6 shows recording waveforms obtained in a modified recording circuit.
FIG. 7 shows the modified reading circuit whose waveforms are shown in FIG. 6.

FIG. 6 shows certain waveforms for a slightly modified arrangement whose recording circuit is shown in FIG. 7. Waveform 2A is produced from input waveform 1A by means of the circuit shown in FIG. 7, and the current produced, in the read head upon reading the magnetic simulation of waveform 2A is shown at 3A. After squaring this gives 4A, and after differentiating and mixing, as in the upper part of FIG. 5, gives waveform 5A, which has a pulse per transition. This waveform is compared by coincidence gating, such as in FIG. 3, with a pulse train 6A each pulse of which occurs at the mid-point of an element being read. From the waveform it will be seen that coincidence of pulses in 5A and 6A represents 1 read while non-coincidence represents 0 read. Hence waveform 7A is produced. When this controls a bistable circuit we get waveform 8A.

Figure 9:
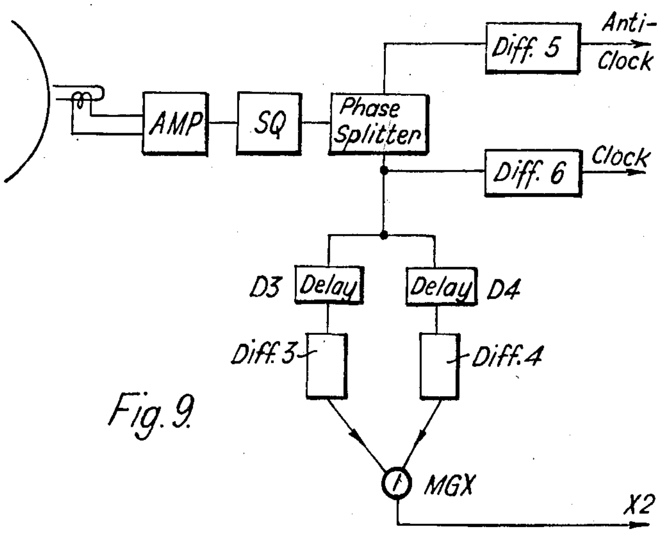
FIG. 9 shows circuits used to generate certain control waveforms used in the ternary system.

In the circuit of FIG. 7, two pulse trains are used, the anticlock train and the waveform P, which can be produced in the manner shown in FIG. 9 for generating X2. The bistable device RR in FIG. 7 corresponds to RR in FIG. 2 and has 1 energised for a 1 and 0 energised for a 0, so G20 passes two P pulses for 1 while G21 passes one anticlock pulse for 0. The mixing and control of WR are similar to the corresponding arrangement for FIG. 2.

FIG. 9 shows how the clock and anti-clock pulses are derived from permanent recordings on a track on the drum via an amplifier, squarer, phase-splitter and two differentiators. The output of the phase-splitter which controls differentiator 5 is a pulse spaced by half an element time from a clock pulse. The clock pulse output of the phase-splitter also goes via delay D3 and differentiator 3, and delay D4 and differentiator D4 to a mixing gate MGX. D3 has a delay of approximately one quarter of an element time and D4 of three quarters of an element time. Hence waveform X2, waveform 23 in FIG. 8, is produced.

Figure 8:
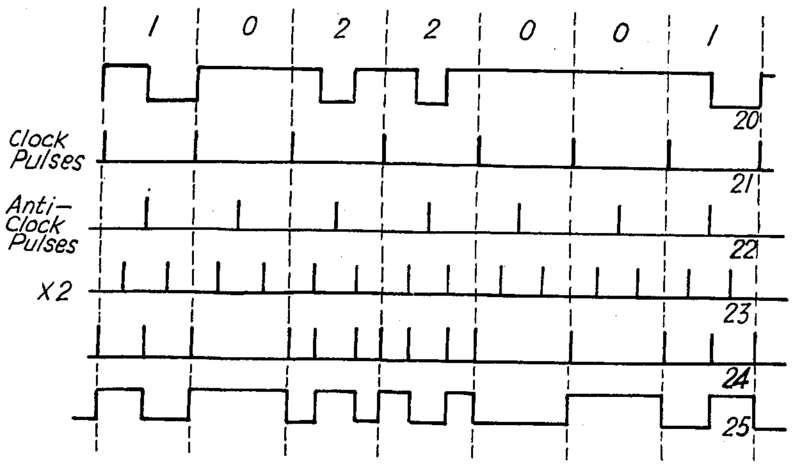
FIG. 8 shows recording waveforms which occur in an embodiment of the invention in which intelligence in a ternary (or three condition) code is recorded.

An input in the ternary notation is shown at waveform 20, FIG. 8, thus being a number 1022001. 0 is represented by a positive pulse equal in duration to one element, 1 by a positive pulse of half an element time followed by negative of half an element time, and 2 by positive-negative-positive, each being of one third of an element time.

Figure 10:
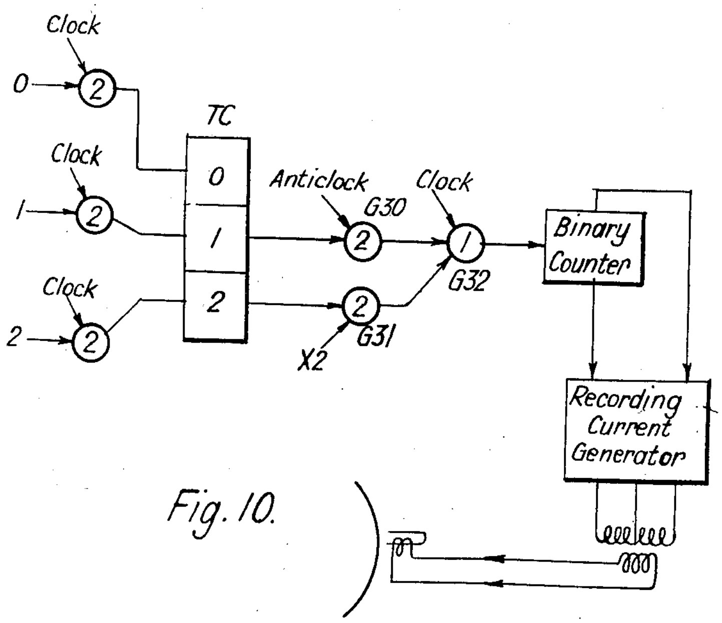
FIG. 10 shows the ternary system recording circuit.

Turning now to FIG. 10, the ternary notation intelligence to be recorded is received on three leads, so that on the clock pulse, the tristable circuit TC is set to the state 0, 1 or 2, as demanded by the incoming element. The output of TC1 opens gate G30 to anticlock pulses, while that of TC2 opens G31 to X2. G32 mixes the outputs of G30 and G31 with clock pulses, producing waveform 24, which controls the binary pair, which gives as its output waveform 25. This has one transition for 0, two for 1 and three for 2, and controls the recording circuit generator. It is clear that the magnetic recording of waveform 25 will represent element 0 by one wide pulse simulating form in an element interval, element 2 by two successive narrower pulse simulating forms of relatively opposite polarity within an element interval, and intelligence element 3 by three still narrower successive pulse simulating forms alternating in polarity within an element interval.

Figure 11:
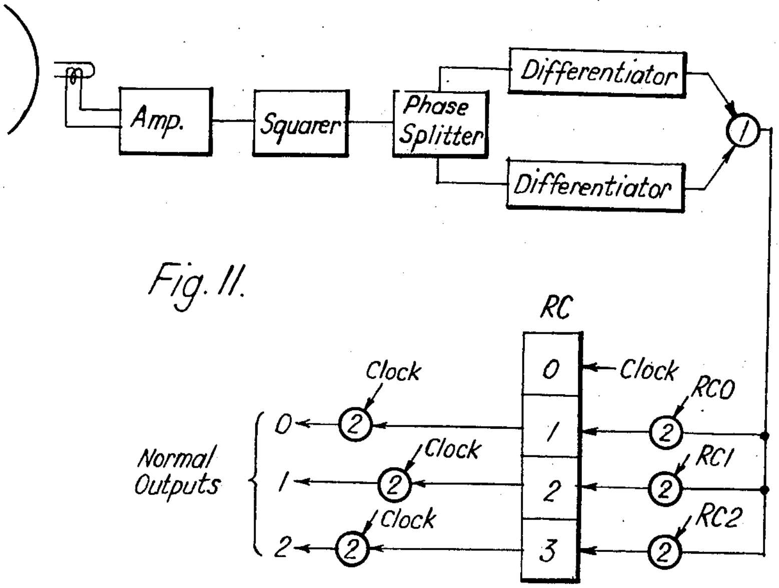
FIG. 11 shows the ternary system reading circuit.

The reading circuit of FIG. 11 is identical to that of FIG. 5 except that the multistable register RC has intelligence stages RC1, RC2, RC3, feeding outputs for 0, 1 and 2 respectively. These, via the gates shown control three output leads.

An extra following stage 3 in FIG. 11 could also be used for error checking purposes in the same manner as the last stage in FIG. 5.

While the principles of the invention have been described above in connection with specific embodiments, and particular modificaions thereof, it is to be clearly understood that this description is made only by way of example and not as a limitation on the scope of the invention.

What we claim is:

1. A magnetic storage system, for intelligence of which each element may have either of two different values, in which each element of said intelligence is recorded as a pattern of magnetization within a discrete length of an endless magnetic track on the periphery of a rotatable drum, and in which the pattern of magnetization representing the first of said values consists of a single reversal of the orientation of said magnetization and the pattern of magnetization representing the second of said values consists of two reversals of the orientation of said magnetization, and which system comprises means under control of the intelligence to be recorded and of a source of pulses each of which occurs at the mid-point of an intelligence element to generate a first pulse train consisting of a pulse at the mid-point of each element having said second value, means for mixing said first pulse train and a train of pulses each of which occurs at the beginning of an element to produce a second pulse train, a binary pair so controlled by said second pulse train as to change its condition once in response to a received element of said first value and twice in response to a received element of said second value, and means under control of the outputs from said binary pair to generate current for causing said recording on the track on said drum.

2. A magnetic storage system for intelligence of which each element may have either one of two different values, in which each element of said intelligence is recorded as a pattern of magnetization within a discrete length of a magnetic track on a magnetic record medium, and in which the pattern of magnetization representing the first of said values consists of a single reversal of the orientation of said magnetization and the pattern of magnetization representing the second of said values consists of two reversals of the orientation of said magnetization, and which system comprises a first input which is energised when the element to be recorded is of said first value, a second input which is energised when the element to be recorded is of said second value, a source of pulses each of which occurs at the mid-point of an element, means under control of said first input and the latter pulses to produce a first pulse train consisting of a pulse at the mid-point of each element of said first value, a further source of pulses to provide a pair of pulses of each element of said second value, one of said pair of pulses occurring at approximately one quarter of the discrete length of the magnetic track representing an element and one at approximately three quarters of said discrete length from the start thereof, means under control of said second input and the pulses from said further source to produce a second pulse train having two pulses per element of said second value, means for mixing said first and second pulse trains to produce a third pulse train, a binary pair which is so controlled by said third pulse train as to change its condition once in response to a received element of said first value and twice in response to a received element of said second value, and means under control of the outputs from said binary pair to generate current for causing said recording on the track on said drum.

3. A magnetic storage system for intelligence of which each element may have either one of two different values, in which each element of said intelligence is recorded as a pattern of magnetization within a discrete length of a magnetic track on a magnetic record medium, and in which the pattern of magnetization representing the first of said values consists of a single reversal of the orientation of said magnetization and the pattern of magnetization representing the second of said values consists of two reversals of the orientation of said magnetization, and in which the reading system comprises means for producing a squared pulse train corresponding to the pattern of magnetisation being read, means for delaying said squared pulse train by one element time, means for comparing said squared pulse train and said delayed squared pulse trains at the beginning of each element and means for generating a signal representing an element of said first value if the two pulse trains differ at the instant of comparison and for generating a signal representing an element of said second value if the two pulse trains are identical at the instant of comparison.

4. A magnetic storage system for intelligence each element of which may have any one of three different values, means to develop wave forms representing respectively said different values corresponding to said elements, and means to record each element of said intelligence as a pattern of magnetisation within a discrete length of an endless magnetic track on the periphery of a rotatable drum, in which the pattern of magnetisation representing the first of said values consists of a single reversal of the orientation of said magnetisation, the pattern of magnetisation representing the second of said values consists of two reversals of the orientation of said magnetisation and the pattern of magnetisation representing the third of said values consists of three reversals of the orientation of said magnetisation, said system comprising means under control of the intelligence to be recorded and of a source of pulses each of which occurs at the mid-point of an element for generating a first pulse train consisting of a pulse at the mid-point of each element having said second value, means under control of said intelligence and of a second source of pulses for producing a second pulse train consisting of a pair of pulses for each element of said third value, one of said pair of pulses occurring at about one quarter of an element time and one at about three quarters of an element time from the start of the element, means for mixing said first and second pulse trains and a train of pulses each of which occurs at the start of an element for producing a third pulse train, a binary pair which is so controlled by said third pulse train as to change its condition once in response to an element of said first value, twice in repsonse to an element of said second value and three times in response to an element of said third value, and means under control of the outputs from said binary pair to generate current for causing recording on said track.

References Cited in the file of this patent

UNITED STATES PATENTS

| | | |
|---|---|---|
| Re. 22,394 | Moore | Nov. 23, 1943 |
| 2,502,440 | Deakin | Apr. 4, 1950 |
| 2,557,964 | Herbst | June 26, 1951 |
| 2,614,169 | Cohn | Oct. 14, 1952 |
| 2,628,346 | Burkhart | Feb. 10, 1953 |
| 2,704,361 | Pouliart et al. | Mar. 15, 1955 |
| 2,771,596 | Bellamy | Nov. 20, 1956 |
| 2,887,674 | Greene | May 19, 1959 |